United States Patent
Rainer

(10) Patent No.: US 7,501,380 B1
(45) Date of Patent: Mar. 10, 2009

(54) COMPOSITIONS FOR THE ABSORPTION OF DISSOLVED METALS

(76) Inventor: Norman B. Rainer, 2008 Fondulac Rd., Richmond, VA (US) 23229

( * ) Notice: Subject to any disclaimer, the term of this patent is extended or adjusted under 35 U.S.C. 154(b) by 0 days.

(21) Appl. No.: 11/803,076

(22) Filed: May 14, 2007

Related U.S. Application Data

(60) Provisional application No. 60/800,161, filed on May 15, 2006.

(51) Int. Cl.
*B01J 20/22* (2006.01)
*B01J 20/00* (2006.01)
*B01J 20/26* (2006.01)
*B01J 49/00* (2006.01)
*C21B 15/00* (2006.01)
*B32B 5/16* (2006.01)
*B32B 9/00* (2006.01)
*C08J 5/20* (2006.01)

(52) U.S. Cl. .................. 502/401; 502/400; 502/402; 75/711; 428/402; 521/25; 521/29

(58) Field of Classification Search .......... 502/400, 502/401, 402; 75/711; 210/263; 428/402; 521/25

See application file for complete search history.

(56) References Cited

U.S. PATENT DOCUMENTS

| | | | | |
|---|---|---|---|---|
| 5,173,247 A | * | 12/1992 | Woog | 266/170 |
| 5,900,041 A | * | 5/1999 | Riviere et al. | 75/713 |
| 6,277,290 B1 | * | 8/2001 | Ren et al. | 210/749 |
| 6,319,400 B1 | * | 11/2001 | Hirs | 210/275 |
| 6,339,039 B1 | * | 1/2002 | Porath et al. | 502/402 |
| 6,521,340 B2 | * | 2/2003 | Rainer | 428/402 |
| 6,699,389 B1 | * | 3/2004 | Jochle et al. | 210/600 |
| 2006/0163136 A1 | * | 7/2006 | Patil et al. | 210/263 |

* cited by examiner

*Primary Examiner*—Karl E Group
*Assistant Examiner*—Noah S Wiese
(74) *Attorney, Agent, or Firm*—Norman B. Rainer

(57) ABSTRACT

A blended composition of hydrogel polymer granules capable of selectively removing toxic dissolved metal species from water containing abundant innocuous species, and spacer particles which minimize contact between contiguous polymer granules is provided for reducing the impedance of water caused to flow through a confined bed of the composition.

8 Claims, No Drawings

COMPOSITIONS FOR THE ABSORPTION OF DISSOLVED METALS

RELATED APPLICATIONS

This application is based upon Provisional Application U.S. 60/800,161 filed May 15, 2006.

BACKGROUND OF THE INVENTION

1. Field of the Invention

This invention relates to the purification of water, and more particularly concerns compositions for the selective removal of trace levels of toxic metals from water.

2. Description of the Prior Art

Undesirable pollutant species such as dissolved toxic metals can occur regularly or periodically in natural bodies of water such as lakes, rivers, streams, groundwater and stormwater, and in industrial waters such as landfill leachate, municipal sewage systems and wastewater discharges. The toxic metals are primarily multivalent "heavy" metals, and can be caused to form insoluble compounds with anionic additives. Consequently, the most prevalent technique for the removal of the toxic metals is to add to the water a sufficient amount of an anionic precipitating agent. The resultant precipitate is then allowed to settle or is removed by filtration or other methods.

Although precipitative techniques are effective, they require that the water undergoing remediation be accumulated in tanks and held there for considerable periods of time with agitation while the treatment agents are added and dispersed, causing the heavy metals to form precipitates of sufficiently large particle size to facilitate settling and/or filtration. Operations of this nature require large, expensive equipment installation and high operating expense. The high cost of such installations is justifiable only where extremely large volumes of water must be treated on a long term basis, such as in municipal waste water treatment facilities and operations involving large industrial facilities.

Another general technique for removing dissolved metal species from water involves the passage of a stream of the water undergoing remediation through a substantially stationary, water permeable bed of absorbent material. Suitable absorbent materials include ion exchange resins having affinity for species in either cationic or anionic form. The advantage of such technique is that the water can be treated while flowing through a confined bed of the resins, thereby avoiding the need for large holding and processing tanks. Ion exchange resins are generally in the form of spherical beads having been made by catalyzed suspension polymerization of a liquid styrene/divinylbenzene prepolymer mixture. By virtue of controlled conditions of mixing and use of surfactants, the prepolymer is suspended as discrete spherical droplets within an engulfing continuous phase aqueous medium. The resultant product is a polymer in the form of spherical beads having a size generally in the range of 16 to 50 mesh (U.S. Sieve Series), or 1.2 mm to 0.3 mm, respectively. Generally, less than 5% of the product has a size below 50 mesh. The beads are then subjected to chemical treatments which impart specific ion exchange functionality. Because of their bead form and relatively large bead diameter, beds of ion exchange resins in vertically oriented columns or tanks offer relatively little impedance to the flow of water through the bed.

Other specialized absorbents for the removal of trace pollutants from water are available in the form of irregularly shaped granules, the most notable example being granular activated carbon. When comparing absorbents in bead form with absorbents in granule form at the same particle size, beds of granule form absorbents produce higher flow impedance. Even higher flow impedance is encountered when the granules are comprised of water swollen soft polymer, usually referred to as hydrogel polymer and containing between 40% and 70% by weight of water. Examples of the use of hydrogel granules for the selective removal of trace heavy metals from water are disclosed in U.S. Pat. Nos. 7,041,222; 3,715,339 and elsewhere.

The aforesaid hydrogel polymer is generally produced by the thermal condensation polymerization of an aqueous prepolymer solution. The resultant polymer is a large mass which is then subjected to a comminution operation that produces irregularly shaped particles of desired size in the range of 10 to 80 mesh. However, the comminution also produces a significant amount of fines, namely particles having an undesirably small size in the range of 80 to 200 mesh. Said fines are separated from the desired larger granules by a sieving operation. Because of their small size, the fines exhibit faster rates of metals absorption than larger granules of the same composition, but when employed as a bed for the interception of a flow of water to be treated, their high impedance to flow causes a very slow flow rate, or requires a very high pumping pressure. Accordingly, the fines are generally considered to be of little commercial value.

It is accordingly an object of the present invention to diminish the impedance to flow of beds of polymeric absorbent in granular form used for removing dissolved metal species from water flowing through said bed.

It is another object of this invention to provide a composition comprised of absorbent granules, said composition having in bed form diminished resistance to the flow of water therethrough.

It is a further object of the present invention to provide a composition of the aforesaid nature wherein said absorbent granules function to remove dissolved metal species from water.

It is a still further object of this invention to provide a confined bed of the composition of the aforesaid nature.

These objects and other objects and advantages of the invention will be apparent from the following description.

SUMMARY OF THE INVENTION

The above and other beneficial objects and advantages are accomplished in accordance with the present invention by a physical mixture of absorbent granules with spacer particles having a size generally larger than the size of said absorbent granules, said mixture being confined within a porous enclosure to form a bed for intercepting a flow of water.

Preferred absorbent granules are comprised of hydrogel polymer, namely polymer which, in a dry granular state is capable of absorbing between 40% and 70% by weight of water with attendant swelling and softening of the granules. Said absorbent granules have a size smaller than 10 mesh (U.S. Sieve Series) and may have a size between 80 mesh and 200 mesh (U.S. Sieve Series), namely 0.177 mm and 0.074 mm, respectively.

DESCRIPTION OF THE PREFERRED EMBODIMENTS

The preferred polymeric granules, when entered into a vertical column to form a bed, can rapidly and selectively absorb heavy metals from water. For example, dissolved toxic metals such as copper, cadmium, mercury and lead at concentration levels of about one part per million can be removed from a water stream by passing said stream through said bed at a flow rate which provides a contact duration of about one minute within the bed. Such removals can be achieved even in the presence of large amounts of innocuous species. The term "absorb" and variations thereof, as employed herein embraces any mechanism of function, whether adsorption, absorption, or chemical reaction, whereby dissolved species are removed from water.

The rate at which a stream of water passes through a bed of particulate absorbent material within a vertical column or tank is dependent upon the pressure imposed upon the entering stream, the height and cross-sectional area of the bed, and the inherent impedance characteristics of the absorbent material. The impedance characteristics of an absorbent material disposed in the form of a bed are usually defined and measured as the volume of flow per unit cross sectional area per unit of bed depth at various imposed pressures. For example, beds of bead form ion exchange resins having a bead diameter of 1.2 to 0.35 mm (or 16 to 45 mesh) generally exhibit a pressure drop of about 0.8 pounds per square inch (psi) per foot of bed depth at a flow rate of about 10 gallons per minute per square foot of cross sectional area. Granular activated carbon, having a mesh size in the range of about 20 to 50 mesh has, in bed form, a flow resistance about twice that of bead form ion exchange resin of comparable particle size. Hydrogel polymer granules usually exhibit an inherent flow impedance about 50% greater than granular activated carbon of equal granule size.

The present invention is based in part upon the discovery that, by blending polymer hydrogel granules with certain particulate species in critical sizes and amounts, the resultant blend will have reduced flow impedance without adversely affecting the efficiency of the polymer hydrogel granules to treat water caused to flow through said blend.

The particulate species function essentially as spacer particles between otherwise contiguous absorbent granules. The spacer particles may have granular, plate-like or elongated form; typical examples including granular activated carbon; minerals such as talc, vermiculite and pearlite; rockwool; polymeric substances; fibrous material of natural and synthetic origin; and materials of plant origin such as soybean hulls, peanut shells, spaghnum peat moss, tobacco stems and other products of cellulosic content.

The particulate spacer species should have an average size equal to or greater than the average size of the hydrogel granules. The amount of particulate spacer species employed should be in the range of 2% to 10% by weight of the content of the overall blend when the average size of the hydrogel granules is in the range of 10-80 mesh. When the average size of the hydrogel granules is in the range of 80-200 mesh, the weight percent of spacer species should be in the range of 10% to 50%. The blends are homogenized, preferably by a tumbling or high shear mixing operation, and should be stable with respect to gravimetric separation, namely resistant to separation when a quantity of the blend confined within a vessel is subjected to vibrations or tapping of the vessel.

The admixture of the spacer species with the hydrogel granules also produces an increased volume of the blend. Particularly preferred spacer species are of fibrous configuration and relatively stiff consistency. Suitable examples include short length natural products and heavy denier synthetic fibers of nylon, polyester or glass. Suitable short length synthetic fibers, in the size range of 1 to 5 mm are available as floc products generally employed in coatings and as reinforcing additives for plastics. Particularly preferred blends are those which are not only gravimetrically stable, but also which will not separate when submerged in water in an unconfined manner.

In most instances buoyancy effects will cause flotative separation of spacer species. Accordingly, another aspect of the present invention is a confined bed of the aforesaid blended mixture of absorbent granules and spacer particles. In a first embodiment, the bed is confined within a vertically oriented circular cylindrical vessel having a smooth interior wall, and porous bottom and top grates that retain the blended mixture but permit passage of water. It has been found that, in order to prevent movement and consequent separation of the components of the blend, the blend must be compacted 3% to 10%. Such compaction can be achieved in said first embodiment by downward compressive movement of said top grate. Compactions of the bed by amounts greater than 10% of the bed volume have been found to negate the flow enhancing effect of the spacer particles.

In another embodiment of this invention, the absorbent granule/spacer particle blend is confined within a compliant fabric bag having a mesh size smaller than the size of the spacer particles, and the blend is squeezed by the bag to compress the blend to a volumetric reduction of 3% to 10% beyond the volume the blend would have by virtue of gravimetric sedimentation alone. Such degree of compaction has been found to prevent flotative separation of the components of the blend without negating the sought improvement in flow rate through the bed. The fabric bag containing the blend is inserted into a vertical column where the resilient nature of the bag enables the bag to extend into contact with the interior wall of the column to prevent bypass of water between the bag and said interior wall.

The following examples illustrate preferred embodiments of this invention and are not intended to limit the invention in any manner.

EXAMPLE 1

A hydrogel polymer was produced by the thermal condensation of polyethyleneimine with nitrilotriacetic acid by the method 5 described in U.S. Pat. No. 5,096,946, and which is incorporated herein by reference. The resultant polymer was subjected to grinding and sieving operations to produce a 10×40 mesh fraction, namely a collection of granules which pass through a 10 mesh screen (U.S. Sieve Series) and are retained on a 40 mesh screen.

As a control experiment, 195 grams of the 10×40 mesh granules were loaded into a glass column of 1.5 inch inside diameter to form a bed having a height of 11.5" following passage of water through the bed. Water was caused to flow through the bed in a manner to maintain a 10" head of water above the top of the bed of granules. The flow rate through the bed, produced by the overlying hydrostatic head of water was 14.6 cc/minute.

When the inflowing water was made to contain one part/million of dissolved mercury and 2% sodium chloride, it was found that the effluent water had no detectable amount of mercury.

In a separate experiment, representing an embodiment of the present invention, 195 grams of the aforesaid polymer hydrogel granules were blended with 5% by weight of spacer species in the form of dry spaghnum peat moss, having been sieved to an 8×20 fraction, namely passing through an 8 mesh screen, and retained by a 20 mesh screen. The peat moss was blended with the hydrogel granules by tumbling. The resulting mixture is stable with respect to gravimetric separation.

The peat moss/hydrogel granule blend was loaded into a column of the aforesaid nature and was compacted 5% by applying pressure upon a top grate plate. The height of the resultant bed was 14.25", representing about a 20% increase in bed volume in comparison with the previously described bed without peat moss. The flow rate, based upon a 10" head of water above the top of the bed, was 29.6 cc/min, representing about a 100% increase over the previously described bed without peat moss. When water containing one part/million of dissolved mercury and 2% sodium chloride was passed downwardly through the bed at a contact time of 45 seconds, it was found that the effluent water had no detectable amount of mercury.

EXAMPLE 2

Hydrogel polymer granules made by the process described in Example 1 were sieved so as to obtain an 80×200 "fines" fraction. Ninety-eight grams of said fines fraction (dry weight basis) were blended in a bladed food processor unit with 89 grams (dry weight basis) of spacer particles in the form of a shredded recycled newsprint product commonly employed as "blown-in" insulation for the thermal insulation of attic areas of buildings. The shredded newsprint consists of particles averaging ¼" in size and bounded by a highly fibrillated perimeter.

In the resultant blend, the fines granules were found to cling to said fibrillated perimeter, and the blend is resistant to gravimetric separation. The blend was placed in a resilient pouch of square weave construction fabricated of polyester multifilament, having a mesh size of 400 microns (or 40 mesh U.S. Sieve Series), and drawstring closure means.

The confined blend was compacted about 8% in volume prior to closure of the pouch via said drawstring, and the filled pouch was inserted into a clear plastic column of 4 inch inside diameter and 45 inch height and equipped with a bottom retaining grate and exit valve. Water was added to the column to a height of 30 inches, and the resultant hydrostatic head caused said pouch to expand laterally into tight contact with the interior wall of the column. No flotational separation of the components of the blend occurs in the immersed pouch. At a gravity induced flow through the column of 0.5 gal./min., the flow impedance is measured at 0.8 psi per foot of bed depth.

By way of comparison, such flow impedance is less than that of typical bead form ion exchange resins. If the spacer particles were absent, the bottom retainer grate of the column would have to have a 200 mesh porosity, and the resultant flow impedance would be immeasurably high.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A compacted and confined water permeable bed of a composition comprised of:
    a) irregularly shaped hydrogel polymer granules having a mesh size smaller than 10 (U.S. Sieve Series) and capable of selectively removing toxic dissolved metal species from water containing abundant innocuous metal species, and
    b) spacer particles which minimize contact between contiguous polymer granules, thereby reducing the impedance to water caused to flow through said bed, said spacer particles being substantially uniformly dispersed throughout said bed, and said bed having been compacted to a volumetric reduction of 3% to 10% relative to the volume said bed would have by gravimetric sedimentation alone.

2. The composition of claim 1 wherein said hydrogel polymer holds between 40% and 70% of water by weight.

3. The composition of claim 2 wherein said spacer particles are larger in size than said polymer granules.

4. The composition of claim 1 wherein said polymer granules have a size between 10 and 80 mesh, and the weight percent of spacer particles in the blend is between 2% and 10%.

5. The composition of claim 1 wherein said polymer granules have a size between 80 and 200 mesh, and the weight percent of spacer particles in the blend is between 10% and 50%.

6. The composition of claim 1 wherein said spacer particles are of a fibrous nature.

7. The composition of claim 1 wherein said spacer particles are of cellulosic content.

8. The composition of claim 1 wherein said compacted and confined bed is within a an elongated fabric pouch capable of lateral expansion.

* * * * *